Aug. 19, 1941.   P. S. WILLIAMS   2,253,358
SEISMIC EXPLORATION METHOD
Filed Aug. 13, 1938
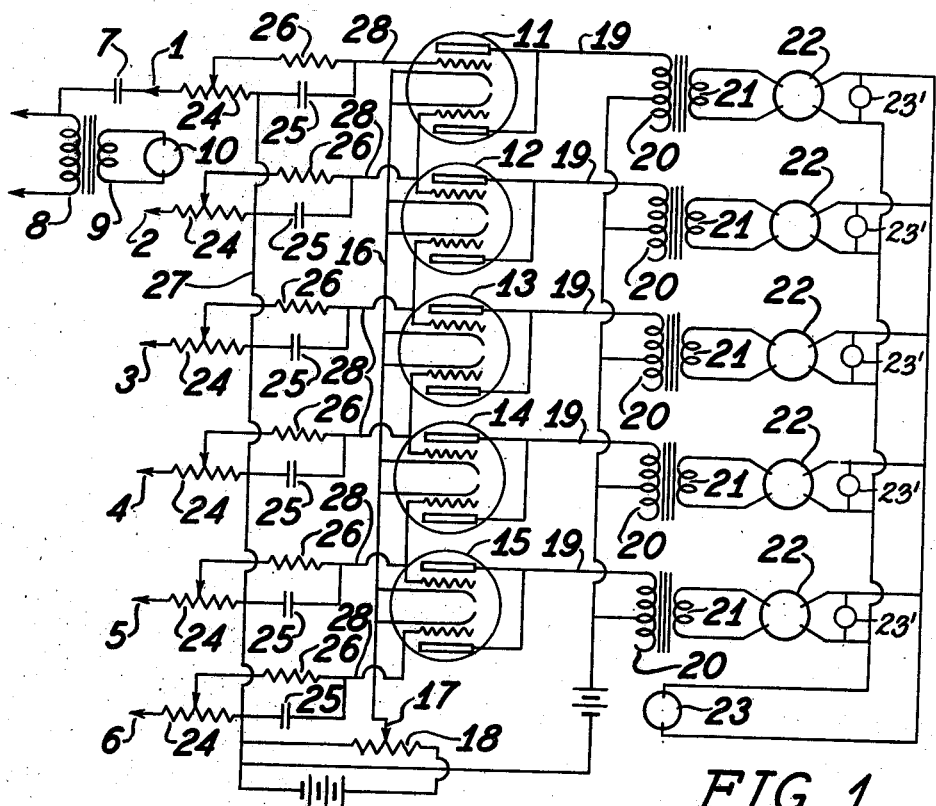
FIG_1_
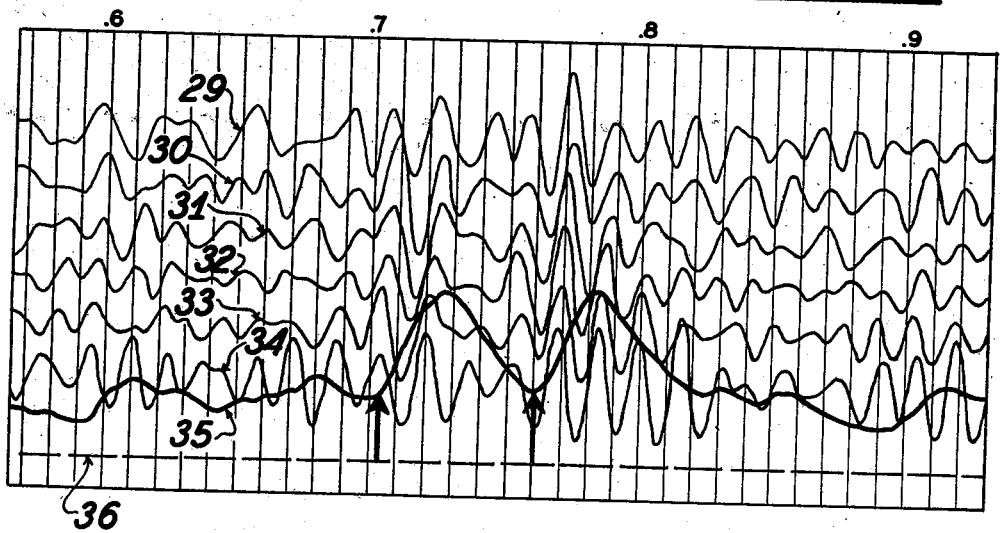
FIG_2_
Philip S. Williams INVENTOR.
BY
J. S. Small ATTORNEY.

Patented Aug. 19, 1941

2,253,358

UNITED STATES PATENT OFFICE 2,253,358

SEISMIC EXPLORATION METHOD

Philip S. Williams, Tulsa, Okla., assignor to Standard Oil Development Company, a corporation of Delaware Application August 13, 1938, Serial No. 224,698

6 Claims. (Cl. 181—0.5)

The present invention is directed to that branch of geophysical exploration which is known as reflection seismography. It is directed particularly to an improvement in the procedure and apparatus employed in this type of exploration.

Reflection seismography, as practiced in geophysical prospecting for the profiling of substrata, is typically carried out by setting off a charge of explosive at a set point, known as the shot-point, and picking up the waves emanating from the explosion, after they have been reflected by substrata, at a plurality of points usually in alignment with the shot-point and spaced from the shot-point and from each other. The reflected waves are picked up at the receiving points by seismopickups. These seismopickups are devices which are provided with means for converting mechanical vibrations into electrical impulses. Each seismopickup is connected to a suitable electrical amplifying circuit the output of which is connected to a moving coil galvanometer with a mirror attached to the coil. Conventionally, these galvanometers are arranged in a battery in such relation to a moving strip of sensitized paper and to a light source as to record on the paper a plurality of wave forms, or "traces," the same in number as the seismopickups, which have their longitudinal axes parallel with the longitudinal axis of the strip of paper. The strip of paper is moved longitudinally at a substantially constant speed and is provided with transverse time marks so as to make possible the determination of the time of arrival of any particular point on the trace after the firing of the shot.

The use of records so produced to give information as to the subsurface structure of the earth is based on the idea that the seismic disturbance caused by the explosion will travel downwardly into the earth and be reflected back to the surface by various more or less well defined strata existing below the surface, and that the arrival at the surface of these reflected energies will be detectable on the record. The arrival time of such a disturbance can be read from the record, and from it the depth of the reflecting stratum can be computed, using data otherwise obtained on the velocity of seismic waves in the substrata.

The detection of reflected waves on the record is very often extremely difficult. The traces, as a rule, show rather continuous random disturbances, coming directly or by refraction from the shot, or created by outside disturbances such as moving objects in the vicinity and the wind, or consisting of weak and/or multiple reflections. There are two criteria for a reflection. The first is based on the direction-finding properties of the seismopickup arrangement and requires that a disturbance, to be a reflection, be visible on each of the traces in such a time sequence as to indicate that it was coming from some point below, rather than horizontally from the shot. The second, based on the fact that such a time sequence could occur accidentally, requires that a reflection must show some increase in the amplitude of the motion indicated by the traces. These two criteria are fundamentally connected in that a reflection, to show through the random disturbances, must signal the arrival of additional vibratory energy from the subsurface.

In the interpretation of the records displaying the reflected waves, the chief emphasis has been on the exact arrival time of a disturbance on the various traces. When the arrival times of a disturbance on the various traces follow a line transversely of the record which is inclined to the vertical more or less than would be expected from the spacing of the seismopickups from the shot point, and the computed velocities of seismic waves in the substrata, the record indicates that the reflecting substratum is inclined downwardly or upwardly from the shot point in the direction of the seismopickups depending upon the angle which the aforesaid transverse line makes with the horizontal. This is in addition to, or may be substituted for, the use of the arrival times of the reflection to compute depths directly. The amplitude characteristics of the reflections have received little attention except as a sort of index of quality, the better reflections, in general, being those which cause the greatest increase in amplitude.

In order to use records taken at various points of an area in mapping the subsurface structure of that area by depth determinations at the points, it is not sufficient merely to point out the various places on each record (considered individually) at which reflections seem to exist. Two additional steps are necessary: (a) In the first place it is necessary to follow one or more particular reflections from record to record across an area, since otherwise the depth calculations from successive records would not all refer to the same geological strata and the resulting subsurface map would be meaningless. This identification of reflections is often difficult, especially when the records in general show a group of reflections close together; this condition is frequently complicated by the fact that on some of the records one or more of the reflections of the group may be missing altogether. (b) In the second place it is necessary, when the reflection has been identified, to use the proper peak or valley in the computation of depths. Since there may be several peaks and valleys present on the traces, the procedure is to select, say, the second valley and use it for depth calculations throughout the area. But where the reflection is weak, or where another reflection is visible just ahead of it, this selection may be quite uncertain.

Nearly all the decisions involved in taking the steps (a) and (b) above depend fundamentally on the characteristics of the reflections considered in the light of the two criteria for the existence of a reflection previously mentioned—a lining up of the disturbances on the traces, and an increase in the general amplitude of the traces. Now, when there are six or more traces on a record, it requires a certain amount of experience and skill to evaluate their "average" behavior by inspection, and when two or more records are being compared the problem is further complicated. Therefore, a need existed for a means of indicating on a single trace on each record the average characteristics of the record at each instant, in the light of the two fundamental criteria.

In my co-pending application Ser. No. 214,374, entitled Seismic exploration method, and filed on June 17, 1938, I have described a method for producing a seismic record which simplifies the task of evaluating the record according to which the amplitudes of the traces are recorded on the record without regard to sign, either by the recording of the amplitude of each trace separately or by recording as a single trace the average amplitude of the traces, said amplitude trace being useful whether recorded alone or in conjunction with the conventional traces. The provision of this amplitude trace facilitated the evaluation of seismic records insofar as the amplitude test of reflections was concerned. It is the object of the present invention to provide a method and apparatus for producing on a seismic record either in conjunction with or instead of the conventional traces a trace in which the amplitudes of the conventional traces and their phase relations are combined in a unique and informative manner.

According to the present invention, there is recorded on the seismic record a single trace the deflection of which at each instant is proportional to a quantity dependent upon the amplitude without regard to sign of the received waves and upon their phase relation. This deflection may be described mathematically as Z in the following equation:

$$Z = K \sum_{1}^{N-1} \sqrt{[f_n(t) + f_{n+1}(t)]^2}$$

where
N = number of regular traces on the record;
$f_n(t)$ = the function of time $(t)$ which describes the behavior of the $n$th trace;
K = a constant of proportionality.

Each term of the above summation is the amplitude without regard to sign of the algebraic sum (at any instant) of the deflections of adjacent traces. The amplitude of the sum is obviously dependent on the amplitudes shown on the two traces in question, and also on their phase relations; if, to take a special case, the two traces each showed sinusoidal motion of unit amplitude, the amplitude of their algebraic sum would vary from zero to 2, depending on their phase relation. Z will then be proportional to the average value at each instant of the amplitudes without regard to sign of the above sums for all adjacent pairs of traces on a record. That is, it will reflect the general line-up and amplitude characteristics of the record at each instant.

The advantages of the procedure constituting the present invention can be in part realized by revising the conventional seismic pickup systems so as to combine the impulses from adjacent pickups algebraicly and to record their algebraic sums as single traces all on one side of a zero axis. In this case, for example, there would be five traces for six pickups and these traces instead of being oscillatory in character would be irregular lines, every point on which would have a positive value. It is to be understood that these algebraic sums of adjacent traces or the average of these algebraic sums without regard to sign in a single trace can be produced on a record as a supplement to or as a substitute for the conventional traces.

The nature and objects of the present invention will be better understood from the following detailed description from the accompanying drawing in which Fig. 1 is a schematic view of one type of electrical apparatus for producing a record according to the present invention;

Fig. 2 is a reproduction of a record produced by the apparatus shown in Fig. 1.

Referring to Fig. 1 in detail, each of the leads 1-6, inclusive, is connected through a condenser to the high side of the output transformer of a reflection amplifier, connected to a seismic pickup. In the drawing, lead 1 is shown connected through condenser 7 to the high side of primary 8 of a transformer the terminals of which receive the output of a reflection amplifier not shown. Connected across the secondary 9 of this transformer is a galvanometer 10. It will be understood that there is a galvanometer 10 for each seismic pickup and, accordingly, for each of leads 1-6, inclusive, and these galvanometers are arranged in a battery in a conventional manner in such a relation to a moving strip of sensitized paper and a light source that the movements of their mirrors are recorded on the paper, thereby producing the conventional traces which are described by the functions $f_1(t)$ to $f_6(t)$, inclusive (see above equation). This is all part of a conventional pickup system and is omitted from the drawing for the sake of simplicity.

The recording circuit for the average amplitude trace of the algebraic sums of adjacent traces includes five vacuum tubes 11-15, inclusive. Each of these tubes is a double triode. The plates of each tube are connected together. The cathodes of all the tubes are connected to a common conductor 16 which is connected to a pointer 17 of a low-resistance potentiometer 18 across which is connected a source of D. C. voltage for the tube filaments. Each pair of plates is connected by a conductor 19 to the primary 20 of a transformer, across the secondary 21 of which is connected a full wave copper oxide rectifier 22. All of the rectifiers 22 are connected in parallel to a galvanometer 23.

Each of leads 1-6, inclusive, is connected to a grid of a vacuum tube through a network which includes a potentiometer 24 which is connected in series with a condenser 25. In each of these networks a resistance 26 is arranged across the condenser and connected to the pointer of the potentiometer. A ground wire 27 is connected to each network between the potentiometer and the condenser. The potentiometer resistances and condensers are so designed with regard to the electrical and mechanical characteristics of the galvanometers 10 that the form of the voltage fluctuations at the points 28 can also be described to a close approximation by the corresponding functions $f_n(t)$. The ratio of inches deflection of the galvanometers 10 to the voltage variations at points 28 is set to the same value for each of conductors 1–6, inclusive.

Lead 1 is connected to one grid of tube 11. Lead 2 is connected to the other grid of tube 11 and also to one grid of tube 12. Lead 3 is connected to the other grid of tube 12 and to one grid of tube 13. Lead 4 is connected to the other grid of tube 13 and to one grid of tube 14. Lead 5 is connected to the other grid of tube 14 and also to one grid of tube 15. Lead 6 is connected to the other grid of tube 15. Thus the tubes 11–15, inclusive, serve to add adjacent traces algebraicly.

In operation, the potentiometer 18 is set for class A operation of the vacuum tubes. By this, of course, is meant that the changes in plate current with changes of grid voltage with this setting of the potentiometer will vary substantially along a straight line, the setting being such that with no voltage applied through conductors 1–6, inclusive, each tube will operate substantially in the middle of the straight line of its characteristic. It will be evident that each tube will behave as a single triode the grid voltage of which at any instant is the algebraic sum of the voltages on the two grids shown.

Considering the first tube, its net grid voltage will at any instant be proportional to the algebraic sum of the deflections of galvanometers 10 corresponding to conductors 1 and 2. Similarly, the net grid voltage on tube 12 will depend upon the deflections of galvanometers 10 corresponding to conductors 2 and 3, and so on. The obvious functions of the transformer and rectifier, associated with each tube, is to produce a pulsating D. C. proportional to the net A. C. excitation of the two grids of the tube. The rectifiers being connected in parallel with the galvanometer 23, the deflection of galvanometer 23 will represent the average value of the D. C. currents put out by the rectifiers. Thus the relation, set forth mathematically above, will be satisfied where Z corresponds to the deflection of galvanometer 23.

A section of a seismograph record obtained with the aid of the invention is shown in Fig. 2. The regular traces 29–34, inclusive, show the deflections of the galvanometers 10 corresponding to conductors 1–6, inclusive, while the heavy trace 35 shows the deflection of galvanometer 23 which corresponds to the quantity Z, heretofore mentioned. The dash line 36 indicates the zero deflection position of trace 35. The beginnings of two reflections are clearly visible, at about the times indicated by the heavy arrows, on both trace 35 and the six regular traces. The numbers at the top of the record indicate the time in tenths of a second after the firing of the dynamite charge, the faint vertical lines being timing marks, .01 second apart. The manner in which the method of the present invention facilitates the interpretation of the record is quite apparent from Fig. 2 and is even more striking when a plurality of records are studied simultaneously for correlation purposes.

It was pointed out heretofore that instead of producing a record having the conventional traces shown in Fig. 2, it is possible, according to the present invention, to produce a record having traces each of which indicates the amplitude of the algebraic sum of two adjacent conventional traces, such traces being all on one side of the zero line. Such a record may be readily produced by providing a galvanometer 23' for each of the rectifiers 22, instead of having the rectifiers connected in parallel to a single galvanometer.

It is apparent that many changes may be made in the above described arrangement without departing from the essence of the above described invention which is the conception of producing a seismic record on which in addition to or instead of the conventional traces there is recorded a trace which is indicative of the average amplitude without regard to sign of the algebraic sums of adjacent conventional traces or alternatively replacing the conventional traces by traces each of which represents the algebraic sum of adjacent conventional traces. Accordingly, the present invention is in no way restricted to the use of any specific apparatus, but has the scope indicated by the appended claims which are intended to be as broad as the prior art permits.

I claim:

1. Receiving apparatus for seismic waves comprising a plurality of seismic pickups for converting seismic waves into electrical oscillations, means for algebraically combining the oscillations of said seismic pickups in pairs, means for converting said combined oscillations into unidirectional impulses, and means for recording said impulses.

2. In seismic apparatus for conducting seismic explorations including a plurality of seismopickups, each having a corresponding amplifier, for converting seismic waves into electrical oscillations in combination, means for recording oscillating voltages characteristic of said oscillations, means for algebraicly combining the oscillations generated by said pickups in pairs, and means for recording simultaneously with said oscillating voltages a trace which is a function, at least in part, of the algebraic sum of the electrical impulses generated by a pair of pickups.

3. In seismic apparatus for conducting seismic exploration including a plurality of seismopickups, each having a corresponding amplifier, for converting seismic waves into electrical oscillations, in combination, means for algebraicly combining the oscillations generated by said seismopickups in pairs, means for converting the resulting combinations into unidirectional impulses, means for averaging said unidirectional impulses, and means for recording the average so obtained.

4. In seismic apparatus for conducting seismic exploration including a plurality of pickups, each having a corresponding amplifier, for converting seismic waves into electrical oscillations, in combination, means for recording a plurality of oscillating voltages each of which is characteristic of oscillations generated by one of said pickups, means for algebraicly combining the oscillations generated by said pickups in pairs, means for converting the oscillations resulting from this combination into unidirectional impulses, means for averaging said unidirectional impulses and means for recording the average so obtained simultaneously with said oscillating voltages.

5. An apparatus according to the preceding claim in which the means for algebraicly combining oscillations includes a vacuum tube for each pair of seismopickups, said vacuum tube being provided with two grids and two plates, means for electrically connecting a different seismopickup with each of said grids, and means for electrically connecting the two plates of the vacuum tube.

6. An apparatus for seismic exploration comprising a plurality o pickups for converting seismic waves into electrical oscillations, an amplifier for each of said pickups having a transformer output, a galvanometer connected across the secondary of the transformer output of each of said amplifiers, a lead connecting the primary of each of said transformer outputs to a combining circuit including a plurality of vacuum tubes each having a pair of grids and a pair of plates, said leads being so connected to said combining circuit that each grid in a single tube is connected to a different lead and one grid of each of a pair of tubes is connected to the same lead, means for connecting the plates of each tube together and to the primary of a transformer, a rectifier arranged across the secondary of said transformer, there being one of said transformers for each tube, and means for connecting all of the rectifiers in parallel across a galvanometer.

PHILIP S. WILLIAMS.